United States Patent
Kim et al.

(10) Patent No.: US 9,591,561 B2
(45) Date of Patent: Mar. 7, 2017

(54) METHOD FOR PERFORMING A MOBILITY RELATED PROCEDURE AND USER EQUIPMENT THEREOF

(71) Applicant: LG ELECTRONICS INC., Seoul (KR)

(72) Inventors: Jaehyun Kim, Seoul (KR); Sunghoon Jung, Seoul (KR); Taehun Kim, Seoul (KR); Hyunsook Kim, Seoul (KR); Laeyoung Kim, Seoul (KR); Taehyeon Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 71 days.

(21) Appl. No.: 14/631,497

(22) Filed: Feb. 25, 2015

(65) Prior Publication Data

US 2015/0245258 A1    Aug. 27, 2015

Related U.S. Application Data

(60) Provisional application No. 61/944,067, filed on Feb. 25, 2014.

(51) Int. Cl.
*H04W 36/00* (2009.01)
*H04W 48/18* (2009.01)

(52) U.S. Cl.
CPC .................. *H04W 48/18* (2013.01)

(58) Field of Classification Search
CPC ....................................................... H04W 36/00
See application file for complete search history.

(56) References Cited

U.S. PATENT DOCUMENTS

2012/0170453 A1* 7/2012 Tiwari ................ H04W 76/027
370/230

* cited by examiner

*Primary Examiner* — Huy D Vu
*Assistant Examiner* — Teisha D Hall
(74) *Attorney, Agent, or Firm* — Birch, Stewart, Kolasch & Birch, LLP

(57) ABSTRACT

One embodiment provides a method for performing a mobility related procedure. The method may comprise: transmitting, by the UE configured with a $2^{nd}/3^{rd}$ generation mobile communication capability and $4^{th}$ generation mobile communication capability, a mobility management request message to a first network entity in the $4^{th}$ generation mobile communication network of a visited public land mobile network (VPLMN); receiving, by the UE and from the first network entity, a mobility management reject message including a rejecting cause value, a first timer and a second timer; if the rejecting cause value indicates that there is no suitable cell in the VPLMN, starting the first timer included in the mobility management reject message; if the first timer is expired, starting the second timer; and until the second timer is expired, disabling the $4^{th}$ generation communication capability.

12 Claims, 12 Drawing Sheets

METHOD FOR PERFORMING A MOBILITY RELATED PROCEDURE AND USER EQUIPMENT THEREOF

CROSS-REFERENCE TO RELATED APPLICATIONS

This application claims the benefit of priority of U.S. Provisional application No. 61/944,067 filed on Feb. 25, 2014, all of which is incorporated by reference in their entirety herein.

BACKGROUND OF THE INVENTION

Field of the Invention

The present invention relates to a paging procedure and a tracking area update procedure.

Related Art

In 3GPP in which technical standards for mobile communication systems are established, in order to handle 4th generation communication and several related forums and new technologies, research on Long Term Evolution/System Architecture Evolution (LTE/SAE) technology has started as part of efforts to optimize and improve the performance of 3GPP technologies from the end of the year 2004.

SAE that has been performed based on 3GPP SA WG2 is research regarding network technology that aims to determine the structure of a network and to support mobility between heterogeneous networks in line with an LTE task of a 3GPP TSG RAN and is one of recent important standardization issues of 3GPP. SAE is a task for developing a 3GPP system into a system that supports various radio access technologies based on an IP, and the task has been carried out for the purpose of an optimized packet-based system which minimizes transmission delay with a more improved data transmission capability.

An Evolved Packet System (EPS) higher level reference model defined in 3GPP SA WG2 includes a non-roaming case and roaming cases having various scenarios, and for details therefor, reference can be made to 3GPP standard documents TS 23.401 and TS 23.402. A network configuration of FIG. 1 has been briefly reconfigured from the EPS higher level reference model.

FIG. 1 shows the configuration of an evolved mobile communication network.

An Evolved Packet Core (EPC) may include various elements. FIG. 1 illustrates a Serving Gateway (S-GW) 52, a Packet Data Network Gateway (PDN GW) 53, a Mobility Management Entity (MME) 51, a Serving General Packet Radio Service (GPRS) Supporting Node (SGSN), and an enhanced Packet Data Gateway (ePDG) that correspond to some of the various elements.

The S-GW 52 is an element that operates at a boundary point between a Radio Access Network (RAN) and a core network and has a function of maintaining a data path between an eNodeB 22 and the PDN GW 53. Furthermore, if a terminal (or User Equipment (UE) moves in a region in which service is provided by the eNodeB 22, the S-GW 52 plays a role of a local mobility anchor point. That is, for mobility within an E-UTRAN (i.e., a Universal Mobile Telecommunications System (Evolved-UMTS) Terrestrial Radio Access Network defined after 3GPP release-8), packets can be routed through the S-GW 52. Furthermore, the S-GW 52 may play a role of an anchor point for mobility with another 3GPP network (i.e., a RAN defined prior to 3GPP release-8, for example, a UTRAN or Global System for Mobile communication (GSM) (GERAN)/Enhanced Data rates for Global Evolution (EDGE) Radio Access Network).

The PDN GW (or P-GW) 53 corresponds to the termination point of a data interface toward a packet data network. The PDN GW 53 can support policy enforcement features, packet filtering, charging support, etc. Furthermore, the PDN GW (or P-GW) 53 can play a role of an anchor point for mobility management with a 3GPP network and a non-3GPP network (e.g., an unreliable network, such as an Interworking Wireless Local Area Network (I-WLAN), a Code Division Multiple Access (CDMA) network, or a reliable network, such as WiMax).

In the network configuration of FIG. 1, the S-GW 52 and the PDN GW 53 have been illustrated as being separate gateways, but the two gateways may be implemented in accordance with a single gateway configuration option.

The MME 51 is an element for performing the access of a terminal to a network connection and signaling and control functions for supporting the allocation, tracking, paging, roaming, handover, etc. of network resources. The MME 51 controls control plane functions related to subscribers and session management. The MME 51 manages numerous eNodeBs 22 and performs conventional signaling for selecting a gateway for handover to another 2G/3G networks. Furthermore, the MME 51 performs functions, such as security procedures, terminal-to-network session handling, and idle terminal location management.

The SGSN handles all packet data, such as a user's mobility management and authentication for different access 3GPP networks (e.g., a GPRS network and an UTRAN/GERAN).

The ePDG plays a role of a security node for an unreliable non-3GPP network (e.g., an I-WLAN and a Wi-Fi hotspot).

As described with reference to FIG. 1, a terminal (or UE) having an IP capability can access an IP service network (e.g., IMS), provided by a service provider (i.e., an operator), via various elements within an EPC based on non-3GPP access as well as based on 3GPP access.

Furthermore, FIG. 1 shows various reference points (e.g., S1-U and S1-MME). In a 3GPP system, a conceptual link that connects two functions that are present in the different function entities of an E-UTRAN and an EPC is called a reference point. Table 1 below defines reference points shown in FIG. 1. In addition to the reference points shown in the example of Table 1, various reference points may be present depending on a network configuration.

TABLE 1

| REFERENCE POINT | DESCRIPTION |
|---|---|
| S1-MME | A reference point for a control plane protocol between the E-UTRAN and the MME |
| S1-U | A reference point between the E-UTRAN and the S-GW for path switching between eNodeBs during handover and user plane tunneling per bearer |
| S3 | A reference point between the MME and the SGSN that provides the exchange of pieces of user and bearer information for mobility between 3GPP access networks in idle and/or activation state. This reference point can be used intra-PLMN or inter-PLMN (e.g. in the case of Inter-PLMN HO). |
| S4 | A reference point between the SGW and the SGSN that provides related control and mobility support between the 3GPP anchor functions of a GPRS core and the S-GW. Furthermore, if a direct tunnel is not established, the reference point provides user plane tunneling. |

TABLE 1-continued

| REFERENCE POINT | DESCRIPTION |
|---|---|
| S5 | A reference point that provides user plane tunneling and tunnel management between the S-GW and the PDN GW. The reference point is used for S-GW relocation due to UE mobility and if the S-GW needs to connect to a non-collocated PDN GW for required PDN connectivity |
| S11 | A reference point between the MME and the S-GW |
| SGi | A reference point between the PDN GW and the PDN. The PDN may be a public or private PDN external to an operator or may be an intra-operator PDN, e.g., for the providing of IMS services. This reference point corresponds to Gi for 3GPP access. |

Among the reference points shown in FIG. 1, S2a and S2b correspond to non-3GPP interfaces. S2a is a reference point providing the user plane with related control and mobility support between a PDN GW and a reliable non-3GPP access. S2b is a reference point providing the user plane with mobility support and related control between a PDN GW and an ePDG.

FIG. 2 is an exemplary diagram showing the architecture of a common E-UTRAN and a common EPC.

As shown in FIG. 2, the eNodeB 20 can perform functions, such as routing to a gateway while RRC connection is activated, the scheduling and transmission of a paging message, the scheduling and transmission of a broadcast channel (BCH), the dynamic allocation of resources to UE in uplink and downlink, a configuration and providing for the measurement of the eNodeB 20, control of a radio bearer, radio admission control, and connection mobility control. The EPC can perform functions, such as the generation of paging, the management of an LTE_IDLE state, the ciphering of a user plane, control of an EPS bearer, the ciphering of NAS signaling, and integrity protection.

FIG. 3 is an exemplary diagram showing the structure of a radio interface protocol in a control plane between UE and an eNodeB, and FIG. 4 is another exemplary diagram showing the structure of a radio interface protocol in a control plane between UE and an eNodeB.

The radio interface protocol is based on a 3GPP radio access network standard. The radio interface protocol includes a physical layer, a data link layer, and a network layer horizontally, and it is divided into a user plane for the transmission of information and a control plane for the transfer of a control signal (or signaling).

The protocol layers may be classified into a first layer (L1), a second layer (L2), and a third layer (L3) based on three lower layers of the Open System Interconnection (OSI) reference model that is widely known in communication systems.

The layers of the radio protocol of the control plane shown in FIG. 3 and the radio protocol in the user plane of FIG. 4 are described below.

The physical layer PHY, that is, the first layer, provides information transfer service using physical channels. The PHY layer is connected to a Medium Access Control (MAC) layer placed in a higher layer through a transport channel, and data is transferred between the MAC layer and the PHY layer through the transport channel. Furthermore, data is transferred between different PHY layers, that is, PHY layers on the sender side and the receiver side, through the PHY layer.

A physical channel is made up of multiple subframes on a time axis and multiple subcarriers on a frequency axis. Here, one subframe is made up of a plurality of symbols and a plurality of subcarriers on the time axis. One subframe is made up of a plurality of resource blocks, and one resource block is made up of a plurality of symbols and a plurality of subcarriers. A Transmission Time Interval (TTI), that is, a unit time during which data is transmitted, is 1 ms corresponding to one subframe.

In accordance with 3GPP LTE, physical channels that are present in the physical layer of the sender side and the receiver side can be divided into a Physical Downlink Shared Channel (PDSCH) and a Physical Uplink Shared Channel (PUSCH), that is, data channels, and a Physical Downlink Control Channel (PDCCH), a Physical Control Format Indicator Channel (PCFICH), a Physical Hybrid-ARQ Indicator Channel (PHICH), and a Physical Uplink Control Channel (PUCCH), that is, control channels.

A PCFICH that is transmitted in the first OFDM symbol of a subframe carries a Control Format Indicator (CFI) regarding the number of OFDM symbols (i.e., the size of a control region) used to send control channels within the subframe. A wireless device first receives a CFI on a PCFICH and then monitors PDCCHs.

Unlike a PDCCH, a PCFICH is transmitted through the fixed PCFICH resources of a subframe without using blind decoding.

A PHICH carries positive-acknowledgement (ACK)/negative-acknowledgement (NACK) signals for an uplink (UL) Hybrid Automatic Repeat reQuest (HARQ). ACK/NACK signals for UL data on a PUSCH that is transmitted by a wireless device are transmitted on a PHICH.

A Physical Broadcast Channel (PBCH) is transmitted in four former OFDM symbols of the second slot of the first subframe of a radio frame. The PBCH carries system information that is essential for a wireless device to communicate with an eNodeB, and system information transmitted through a PBCH is called a Master Information Block (MIB). In contrast, system information transmitted on a PDSCH indicated by a PDCCH is called a System Information Block (SIB).

A PDCCH can carry the resource allocation and transport format of a downlink-shared channel (DL-SCH), information about the resource allocation of an uplink shared channel (UL-SCH), paging information for a PCH, system information for a DL-SCH, the resource allocation of an upper layer control message transmitted on a PDSCH, such as a random access response, a set of transmit power control commands for pieces of UE within a specific UE group, and the activation of a Voice over Internet Protocol (VoIP). A plurality of PDCCHs can be transmitted within the control region, and UE can monitor a plurality of PDCCHs. A PDCCH is transmitted on one Control Channel Element (CCE) or an aggregation of multiple contiguous CCEs. A CCE is a logical allocation unit used to provide a PDCCH with a coding rate according to the state of a radio channel. A CCE corresponds to a plurality of resource element groups. The format of a PDCCH and the number of bits of a possible PDCCH are determined by a relationship between the number of CCEs and a coding rate provided by CCEs.

Control information transmitted through a PDCCH is called Downlink Control Information (DCI). DCI can include the resource allocation of a PDSCH (also called a downlink (DL) grant)), the resource allocation of a PUSCH (also called an uplink (UL) grant), a set of transmit power control commands for pieces of UE within a specific UE group, and/or the activation of a Voice over Internet Protocol (VoIP).

Several layers are present in the second layer. First, a Medium Access Control (MAC) layer functions to map various logical channels to various transport channels and also plays a role of logical channel multiplexing for mapping multiple logical channels to one transport channel. The MAC layer is connected to a Radio Link Control (RLC) layer, that is, a higher layer, through a logical channel. The logical channel is basically divided into a control channel through which information of the control plane is transmitted and a traffic channel through which information of the user plane is transmitted depending on the type of transmitted information.

The RLC layer of the second layer functions to control a data size that is suitable for sending, by a lower layer, data received from a higher layer in a radio section by segmenting and concatenating the data. Furthermore, in order to guarantee various types of QoS required by radio bearers, the RLC layer provides three types of operation modes: a Transparent Mode (TM), an Un-acknowledged Mode (UM), and an Acknowledged Mode (AM). In particular, AM RLC performs a retransmission function through an Automatic Repeat and Request (ARQ) function for reliable data transmission.

The Packet Data Convergence Protocol (PDCP) layer of the second layer performs a header compression function for reducing the size of an IP packet header containing control information that is relatively large in size and unnecessary in order to efficiently send an IP packet, such as IPv4 or IPv6, in a radio section having a small bandwidth when sending the IP packet. Accordingly, transmission efficiency of the radio section can be increased because only essential information is transmitted in the header part of data. Furthermore, in an LTE system, the PDCP layer also performs a security function. The security function includes ciphering for preventing the interception of data by a third party and integrity protection for preventing the manipulation of data by a third party.

A Radio Resource Control (RRC) layer at the highest place of the third layer is defined only in the control plane and is responsible for control of logical channels, transport channels, and physical channels in relation to the configuration, re-configuration, and release of Radio Bearers (RBs). Here, the RB means service provided by the second layer in order to transfer data between UE and an E-UTRAN.

If an RRC connection is present between the RRC layer of UE and the RRC layer of a wireless network, the UE is in an RRC_CONNECTED state. If not, the UE is in an RRC_IDLE state.

An RRC state and an RRC connection method of UE are described below. The RRC state means whether or not the RRC layer of UE has been logically connected to the RRC layer of an E-UTRAN. If the RRC layer of UE is logically connected to the RRC layer of an E-UTRAN, it is called the RRC_CONNECTED state. If the RRC layer of UE is not logically connected to the RRC layer of an E-UTRAN, it is called the RRC_IDLE state. Since UE in the RRC_CONNECTED state has an RRC connection, an E-UTRAN can check the existence of the UE in a cell unit, and thus control the UE effectively. In contrast, if UE is in the RRC_IDLE state, an E-UTRAN cannot check the existence of the UE, and a core network is managed in a Tracking Area (TA) unit, that is, an area unit greater than a cell. That is, only the existence of UE in the RRC_IDLE state is checked in an area unit greater than a cell. In such a case, the UE needs to shift to the RRC_CONNECTED state in order to be provided with common mobile communication service, such as voice or data. Each TA is classified through Tracking Area Identity (TAD. UE can configure TAI through Tracking Area Code (TAC), that is, information broadcasted by a cell.

When a user first turns on the power of UE, the UE first searches for a proper cell, establishes an RRC connection in the corresponding cell, and registers information about the UE with a core network. Thereafter, the UE stays in the RRC_IDLE state. The UE in the RRC_IDLE state (re) selects a cell if necessary and checks system information or paging information. This process is called camp on. When the UE in the RRC_IDLE state needs to establish an RRC connection, the UE establishes an RRC connection with the RRC layer of an E-UTRAN through an RRC connection procedure and shifts to the RRC_CONNECTED state. A case where the UE in the RRC_IDLE state needs to establish with an RRC connection includes multiple cases. The multiple cases may include, for example, a case where UL data needs to be transmitted for a reason, such as a call attempt made by a user and a case where a response message needs to be transmitted in response to a paging message received from an E-UTRAN.

A Non-Access Stratum (NAS) layer placed over the RRC layer performs functions, such as session management and mobility management.

The NAS layer shown in FIG. 3 is described in detail below.

Evolved Session Management (ESM) belonging to the NAS layer performs functions, such as the management of default bearers and the management of dedicated bearers, and ESM is responsible for control that is necessary for UE to use PS service from a network. Default bearer resources are characterized in that they are allocated by a network when UE first accesses a specific Packet Data Network (PDN) or accesses a network. Here, the network allocates an IP address available for UE so that the UE can use data service and the QoS of a default bearer. LTE supports two types of bearers: a bearer having Guaranteed Bit Rate (GBR) QoS characteristic that guarantees a specific bandwidth for the transmission and reception of data and a non-GBR bearer having the best effort QoS characteristic without guaranteeing a bandwidth. A default bearer is assigned a non-GBR bearer, and a dedicated bearer may be assigned a bearer having a GBR or non-GBR QoS characteristic.

In a network, a bearer assigned to UE is called an Evolved Packet Service (EPS) bearer. When assigning an EPS bearer, a network assigns one ID. This is called an EPS bearer ID. One EPS bearer has QoS characteristics of a Maximum Bit Rate (MBR) and a Guaranteed Bit Rate (GBR) or an Aggregated Maximum Bit Rate (AMBR).

FIG. 5 is a flowchart illustrating a random access process in 3GPP LTE.

The random access process is used for UE 10 to obtain UL synchronization with a base station, that is, an eNodeB 20, or to be assigned UL radio resources.

The UE 10 receives a root index and a physical random access channel (PRACH) configuration index from the eNodeB 20. 64 candidate random access preambles defined by a Zadoff-Chu (ZC) sequence are present in each cell. The root index is a logical index that is used for the UE to generate the 64 candidate random access preambles.

The transmission of a random access preamble is limited to specific time and frequency resources in each cell. The PRACH configuration index indicates a specific subframe on which a random access preamble can be transmitted and a preamble format.

The UE 10 sends a randomly selected random access preamble to the eNodeB 20. Here, the UE 10 selects one of the 64 candidate random access preambles. Furthermore, the UE selects a subframe corresponding to the PRACH configuration index. The UE 10 sends the selected random access preamble in the selected subframe.

The eNodeB 20 that has received the random access preamble sends a Random Access Response (RAR) to the UE 10. The random access response is detected in two steps. First, the UE 10 detects a PDCCH masked with a random access-RNTI (RA-RNTI). The UE 10 receives a random access response within a Medium Access Control (MAC) Protocol Data Unit (PDU) on a PDSCH that is indicated by the detected PDCCH.

FIG. 6 illustrates a connection process in a radio resource control (RRC) layer.

FIG. 6 shows an RRC state depending on whether there is an RRC connection. The RRC state denotes whether the entity of the RRC layer of UE 10 is in logical connection with the entity of the RRC layer of eNodeB 20, and if yes, it is referred to as RRC connected state, and if no as RRC idle state.

In the connected state, UE 10 has an RRC connection, and thus, the E-UTRAN may grasp the presence of the UE on a cell basis and may thus effectively control UE 10. In contrast, UE 10 in the idle state cannot grasp eNodeB 20 and is managed by a core network on the basis of a tracking area that is larger than a cell. The tracking area is a set of cells. That is, UE 10 in the idle state is grasped for its presence only on a larger area basis, and the UE should switch to the connected state to receive a typical mobile communication service such as voice or data service.

When the user turns on UE 10, UE 10 searches for a proper cell and stays in idle state in the cell. UE 10, when required, establishes an RRC connection with the RRC layer of eNodeB 20 through an RRC connection procedure and transits to the RRC connected state.

There are a number of situations where the UE staying in the idle state needs to establish an RRC connection, for example, when the user attempts to call or when uplink data transmission is needed, or when transmitting a message responsive to reception of a paging message from the EUTRAN.

In order for the idle UE 10 to be RRC connected with eNodeB 20, UE 10 needs to perform the RRC connection procedure as described above. The RRC connection procedure generally comes with the process in which UE 10 transmits an RRC connection request message to eNodeB 20, the process in which eNodeB 20 transmits an RRC connection setup message to UE 10, and the process in which UE 10 transmits an RRC connection setup complete message to eNodeB 20. The processes are described in further detail with reference to FIG. 6.

1) The idle UE 10, when attempting to establish an RRC connection, e.g., for attempting to call or transmit data or responding to paging from eNodeB 20, sends an RRC connection request message to eNodeB 20.

2) When receiving the RRC connection message from UE 10, eNodeB 20 accepts the RRC connection request from UE 10 if there are enough radio resources, and eNodeB 20 sends a response message, RRC connection setup message, to UE 10.

3) When receiving the RRC connection setup message, UE 10 transmits an RRC connection setup complete message to eNodeB 20. If UE 10 successfully transmits the RRC connection setup message, UE 10 happens to establish an RRC connection with eNodeB 20 and switches to the RRC connected state.

FIG. 7 shows the states and state transitions and procedures in RRC_IDLE.

If an USIM is inserted into a UE, the UE performs a selection of Public Land Mobile Network (PLMN). For PLMN selection, the AS layer of the UE report a list of available PLMNs to the NAS layer on request from the NAS or autonomously.

During PLMN selection, based on the list of PLMN identities in priority order, the particular PLMN may be selected either automatically or manually. Each PLMN in the list of PLMN identities is identified by a 'PLMN identity'. In the system information on the broadcast channel, the UE can receive one or multiple 'PLMN identity' in a given cell. The result of the PLMN selection performed by NAS is an identifier of the selected PLMN.

After the PLMN selection, the UE shall perform measurements for cell selection and reselection purposes. The NAS can control at least one radio access technology (RAT) in which the cell selection should be performed, for instance by indicating RAT(s) associated with the selected PLMN, and by maintaining a list of forbidden registration area(s) and a list of equivalent PLMNs. The UE selects a suitable cell based on idle mode measurements and cell selection criteria.

In order to speed up the cell selection process, stored information for several RATs may be available in the UE.

When camped on a cell, the UE may regularly search for a better cell according to the cell reselection criteria. If a better cell is found, that cell is selected. The change of cell may imply a change of RAT. Details on performance requirements for cell reselection can be found in [10].

The NAS is informed if the cell selection and reselection results in changes in the received system information relevant for NAS.

For normal service, the UE may camp on a suitable cell, tune to that cell's control channel(s) so that the UE can:
receive system information from the PLMN; and
receive registration area information from the PLMN, e.g., tracking area information; and
receive other AS and NAS Information; and
if registered:
receive paging and notification messages from the PLMN; and
initiate transfer to connected mode.

Meanwhile, referring to FIG. 7, whenever a new PLMN selection is performed, it causes an exit to number 1.

On the other hand, if the UE has roamed to strange place and if there is any suitable VPLMN, any equivalent VPLMN, a user preferred PLMN, or an operator controlled PLMN, the UE periodically searches PLMNs and then perform PLMN selection. In this case, if the UE search any PLMN having a priority higher than that of a currently selected PLMN, the UE stores information on the corresponding PLMN in a list of equivalent PLMNs. Information on a period for performing the PLMN search is determined based on a T value stored in USIM. The T value may be ranged from 6 minutes to 8 hours.

Meanwhile, a MinimumPeriodicSearchTimer may be set in the UE by a NAS Management Object (MO). The MinimumPeriodicSearchTimer means a minimum period for the UE to perform PLMN search.

FIG. 8*a* shows an exemplary scenario where UE has experienced roaming failures.

Referring to FIG. 8a, it is assumed that the UE 10 has subscribed or registered to a Home Public Land Mobile Network (HPLMN). Also, it is assumed that there is only 2G/3G roaming agreement between HPLMN and VPLMN, but there is no 4G (e.g., LTE) roaming agreement between HPLMN and VPLMN.

As the UE 10 moves from the HPLMN to the VPLMN, the UE transmits an Attach request message, a tracking area update (TAU) request message, a routing area update (RAU) request message, or a service request message to a MME/SGSN in a first tracking area (TA#1) of the VPLMN.

However, because there is no roaming agreement between the HPLMN and the VPLMN, the MME/SGSN in the TA#1 of the VPLMN transmits an Attach/TAU/RAU/Service reject message including a rejecting cause #15 indicating there is no suitable cell in the VPLMN. The rejecting cause #15 also means that a network node (e.g., MME, or SGSN) cannot accepts a mobility management request message from the UE in the corresponding TA so that the UE having to perform a PLMN registration and a location update finds out any other tracking area or location area in the PLMN.

Then, the UE 10 adds the current TA#1 into a list of "forbidden tracking area for roaming".

Afterwards, when entering a second TA (TA#2) in the same VPLMN or equivalent VPLMN, the UE 10 attempts to transmits an Attach/TAU/RAU/Service request message to a MME in the TA#2

However, the MME in the TA#2 also transmits an Attach/TAU/RAU/Service reject message including a rejecting cause #15 indicating there is no suitable cell in the VPLMN, since there is no roaming agreement between the HPLMN and the VPLMN.

Considering the above case, although the UE which has no LTE roaming agreement and therefore cannot perform a registration and a location update in 4G (e.g. LTE) network, i.e., E-UTRAN, the UE tires to perform the registration and location update in all TAs in the VPLMN, which results in wasting NAS signaling (e.g., Attach/TAU/Service request) and battery consumption.

FIG. 8b shows another exemplary scenario where UE has experienced roaming failures.

Referring to FIG. 8b, it is assumed that the UE 10 has 4G (e.g., LTE) capability as well as 2G/3G capability. Also, it is assumed that there is only 2G/3G roaming agreement between HPLMN and VPLMN, but there is no 4G (e.g., LTE) roaming agreement between HPLMN and VPLMN.

As the UE 10 which has subscribed or registered to a HPLMN moves to the VPLMN, the UE selects VPLMN and selects 3G network in the VPLMN.

Therefore, the UE 10 performs a PLMN reselection thereby selecting a 4G (e.g., LTE) network in the VPLMN.

And, the UE 10 transmits an Attach request message to MME in the VPLMN.

However, since there is no roaming agreement between the HPLMN and the VPLMN. the MME transmits an Attach reject message including a rejecting cause #15 indicating there is no suitable cell in the VPLMN.

Then, the UE 10 backs to 2G/3G again

After the certain time period, the UE 10 attempts PLMN reselection for LTE cell but fails again.

Considering the above case, whenever the UE performs PLMN reselections for LTE cell, the UE experiences a failure and then suffers from a ping-pong.

SUMMARY OF THE INVENTION

The present disclosure aims to propose a method for addressing the above issues.

To achieve the above objects, one disclosure of the present disclosures provides a method for performing a mobility related procedure, the method performed by a user equipment (UE). The method may comprise: transmitting, by the UE configured with a $2^{nd}/3^{rd}$ generation mobile communication capability and $4^{th}$ generation mobile communication capability, a mobility management request message to a first network entity in the 4th generation mobile communication network of a visited public land mobile network (VPLMN); receiving, by the UE and from the first network entity, a mobility management reject message including a rejecting cause value, a first timer and a second timer; if the rejecting cause value indicates that there is no suitable cell in the VPLMN, starting the first timer included in the mobility management reject message; if the first timer is expired, starting the second timer; and until the second timer is expired, disabling the $4^{th}$ generation communication capability so that the UE tries to transmit the mobility management request message to a second network entity in a $2^{nd}/3^{rd}$ generation mobile communication network of the VPLMN.

The first network entity may be a mobility management entity (MME) and the second network entity is a Serving General Packet Radio Service (GPRS) Supporting Node (SGSN).

The mobility management request message may be one of attach request message, a tracking area update (TAU) request message, a routing area update (RAU) request message, a service request message; and The mobility management reject message may be one of attach reject message, a TAU reject message, a RAU reject message, a service reject message.

The first timer may be a timer for periodic LTE search during PLMN reselection.

The second timer may be a timer for disabling the 4th generation mobile communication capability.

The mobility management reject message may further include: an indication instructing the UE to disable the 4th generation communication capability due to no LTE roaming agreement for 4th generation mobile communication.

To achieve the above objects, one disclosure of the present disclosures provides a user equipment (UE) for performing a mobility related procedure. The UE may comprise a transceiver configured with a $2^{nd}/3^{rd}$ generation mobile communication capability and $4^{th}$ generation mobile communication capability and configured to transmit a mobility management request message to a first network entity in the $4^{th}$ generation mobile communication network of a visited public land mobile network (VPLMN), and receive, from the first network entity, a mobility management reject message including a rejecting cause value, a first timer and a second timer. The UE may further comprise a processor configured to control the transceiver. If the rejecting cause value indicates that there is no suitable cell in the VPLMN, the processor may be further configured to start the first timer included in the mobility management reject message. Also, if the first timer is expired, the processor may be further configured to start the second timer and disable the $4^{th}$ generation communication capability until the second timer is expired, so that the UE tries to transmit the mobility management request message to a second network entity in a $2^{nd}/3^{rd}$ generation mobile communication network of the VPLMN.

DESCRIPTION OF EXEMPLARY EMBODIMENTS

Figure 1:
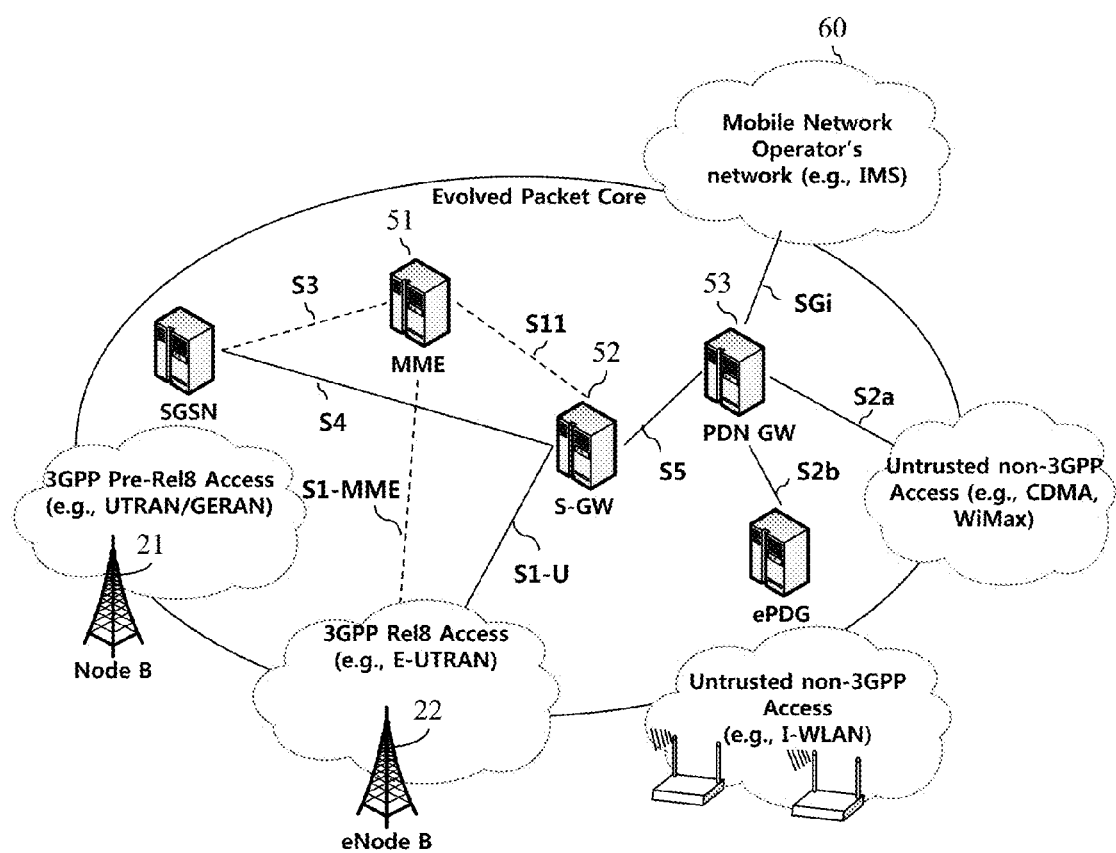
FIG. 1 is a view illustrating the structure of an evolved mobile communication network.
Figure 2:
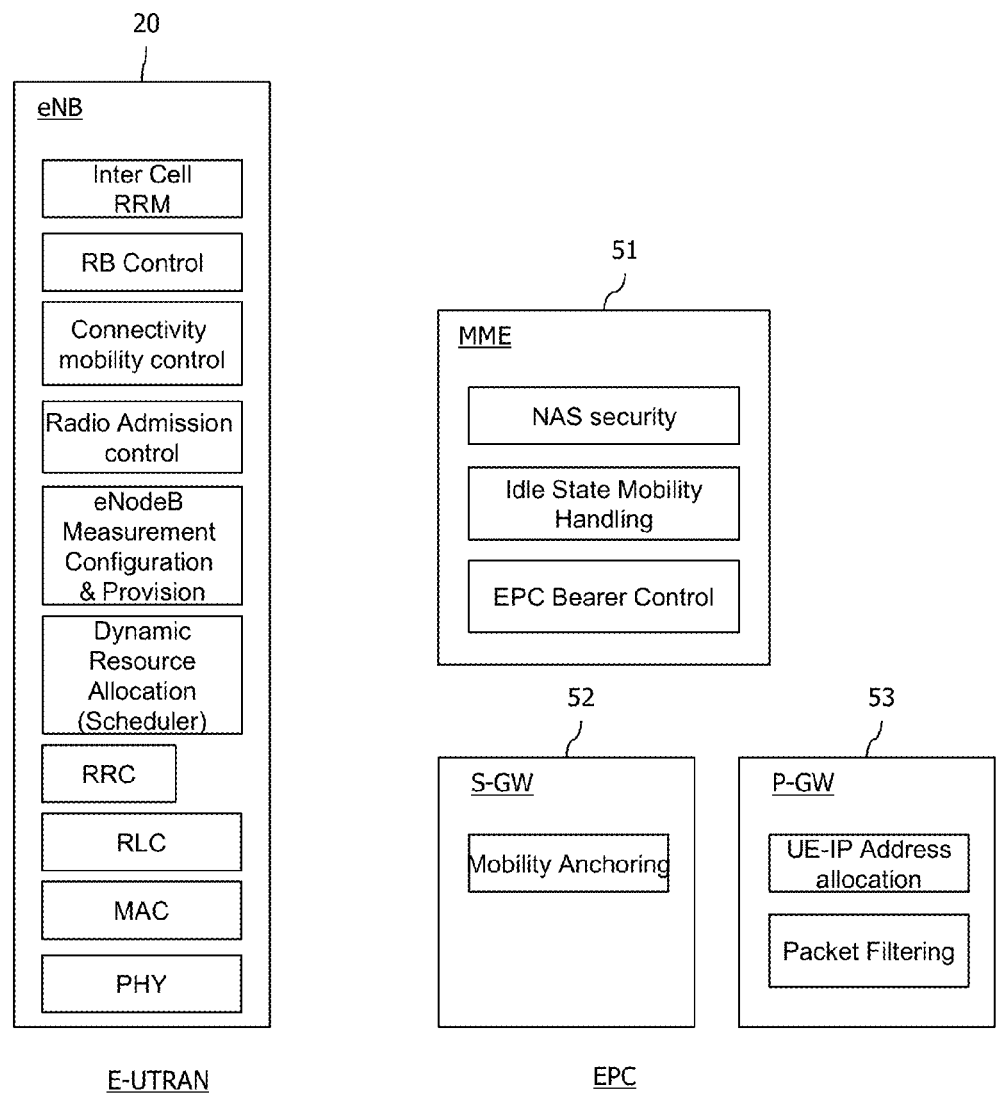
FIG. 2 is an exemplary view illustrating functions of main nodes of a common E-UTRAN and a common EPC.
Figure 3:
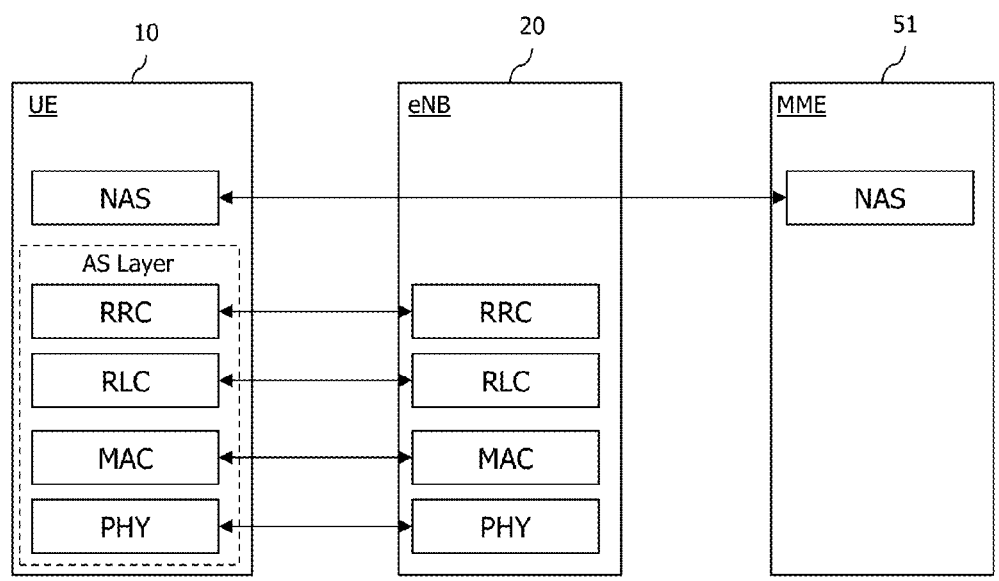
FIG. 3 is an exemplary view illustrating the structure of a radio interface protocol in a control plane between a UE and an eNodeB.
Figure 4:
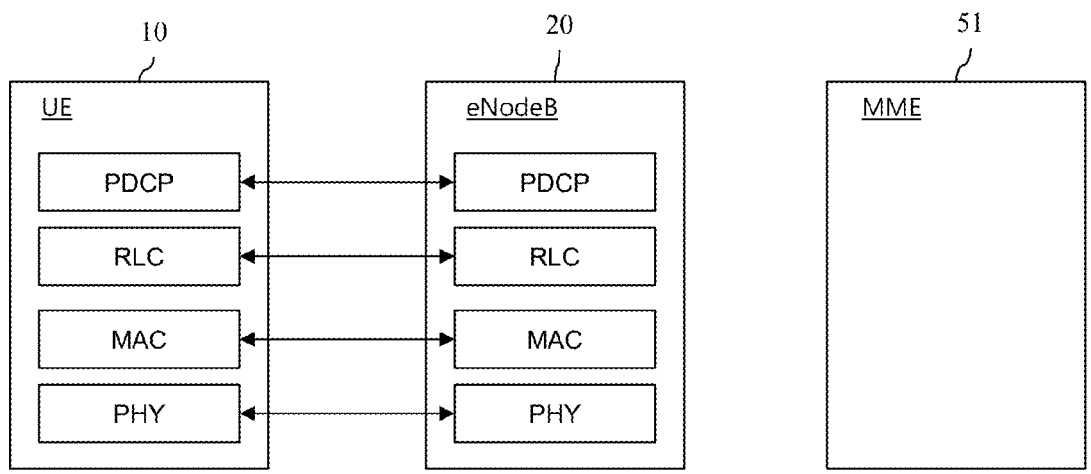
FIG. 4 is another exemplary view illustrating the structure of a radio interface protocol in a user plane between a UE and a base station.
Figure 5:
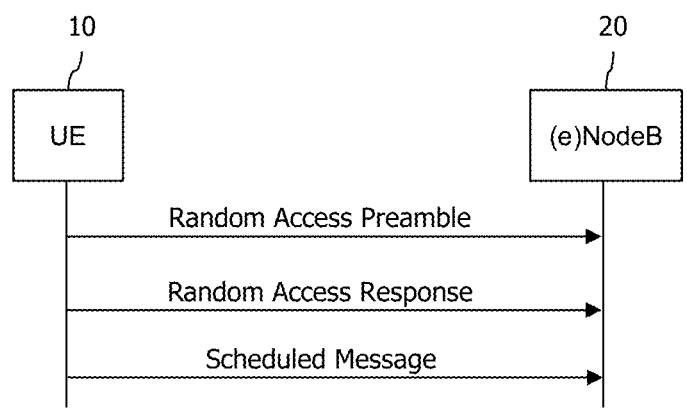
FIG. 5 is a flowchart illustrating a random access procedure in 3GPP LTE.

The present invention is described in light of UMTS (Universal Mobile Telecommunication System) and EPC (Evolved Packet Core), but not limited to such communication systems, and may be rather applicable to all communication systems and methods to which the technical spirit of the present invention may apply.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

In the drawings, user equipments (UEs) are shown for example. The UE may also be denoted a terminal or mobile equipment (ME). The UE may be a laptop computer, a mobile phone, a PDA, a smartphone, a multimedia device, or other portable device, or may be a stationary device such as a PC or a car mounted device.

DEFINITION OF TERMS

For a better understanding, the terms used herein are briefly defined before going to the detailed description of the invention with reference to the accompanying drawings.

UMTS: stands for Universal Mobile Telecommunication System and means a 3rd generation mobile communication network.

UE/MS: User Equipment/Mobile Station. Means a terminal device.

EPC: stands for Evolved Packet Core and means a core network supportive of a long term evolution (LTE) network. An evolved version of UMTS EPS: stands for Evolved Packet System and means a mobile communication system including a UE, an access network including LTE, and an EPC PDN (Public Data Network): an independent network in which a service providing server is located PDN connection: connection from UE to PDN, i.e., association (connection) between a UE represented with an IP address and a PDN represented with an APN (access point name)

PDN-GW (Packet Data Network Gateway): a network node of an EPS network performing functions such as UE IP address allocation, packet screening & filtering, and charging data collection Serving GW (Serving Gateway): a network node of an EPS network performing functions such as mobility anchor, packet routing, idle mode packet buffering, and triggering MME to page UE PCRF (Policy and Charging Rule Function): an EPS network node performing policy decision for dynamically applying QoSs and billing policies differentiated per service flow APN (Access Point Name): name of an access point managed by a network, provided from a UE, i.e., a character string for denoting a PDN or distinguishing a PDN from another. Accessing a requested service or network (PDN) gets through a corresponding P-GW, and an APN is a name (e.g., internet.mnc012.mcc345.gprs) pre-defined in the network to be able to discover the P-GW.

TEID (Tunnel Endpoint Identifier): End point ID of a tunnel configured between nodes in a network. A TEID is configured per section by the bearer of each UE.

NodeB: a UMTS network base station. A NodeB is installed outdoors and corresponds in cell coverage size to a macro cell.

eNodeB: an EPS (Evolved Packet System) base station and is installed outdoors. An eNodeB corresponds in cell coverage size to a macro cell.

(e)NodeB: collectively denotes NodeB and eNodeB

MME: stands for Mobility Management Entity and plays a role to control each entity in an EPS to provide mobility and session for a UE.

Session: a pathway for data transmission. The unit of session may include PDN, bearer, and IP flow which respectively correspond the unit of the overall target network (unit of APN or PDN), the unit distinguished by QoS therein (unit of bearer), and unit of destination IP address.

PDN connection: a connection from a UE to a PDN, i.e., an association (connection) between a UE represented with an IP address and a PDN represented with an APN. This means a connection (UE-PDN GW) between entities in a core network to form a session.

UE Context: information on UE's context used to manage UE in network, i.e., context information consisting of UE id, mobility (e.g., current location), and session attribute (QoS, or priority)

OMA DM (Open Mobile Alliance Device Management): a protocol designed for managing mobile devices such as mobile phones, PDAs, or portable computers and performs functions such as device configuration, firmware upgrade, and error reporting.

OAM (Operation Administration and Maintenance): denotes a group of network management functions displaying network faults and providing capability information, diagnosis and data.

NAS configuration MO (Management Object): MO (Management Object) used to configure in UE parameters associated with NAS functionality Hereinafter, the present disclosure is described with reference to the accompanying drawings.

Figure 9:
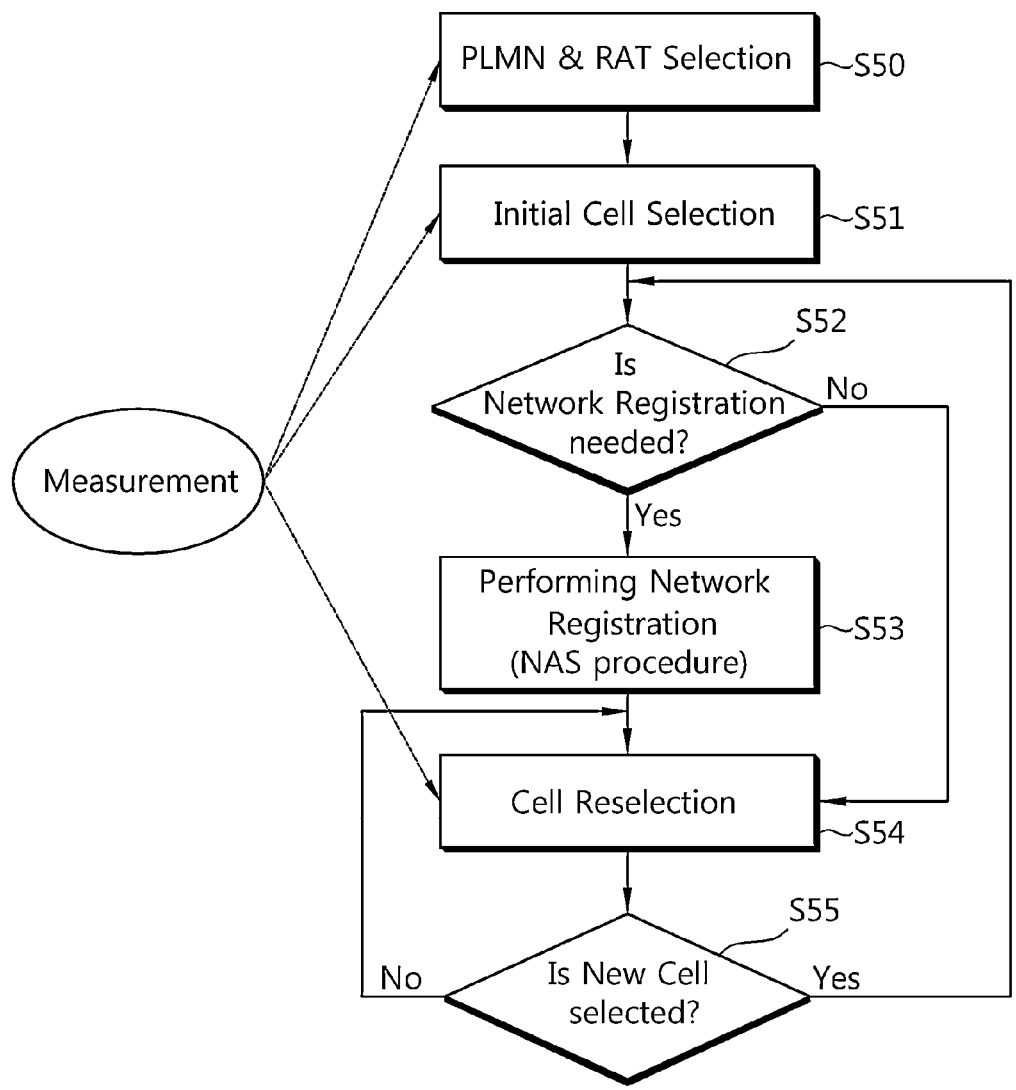
FIG. 9 shows an example of an operation of a UE in an RRC_IDLE.

FIG. 9 shows an example of an operation of a UE in an RRC_IDLE.

It is illustrated in FIG. 9 that a procedure of registering a network through a cell selection and performing a cell reselection if needed after the UE is initially turned on.

Figure 6:
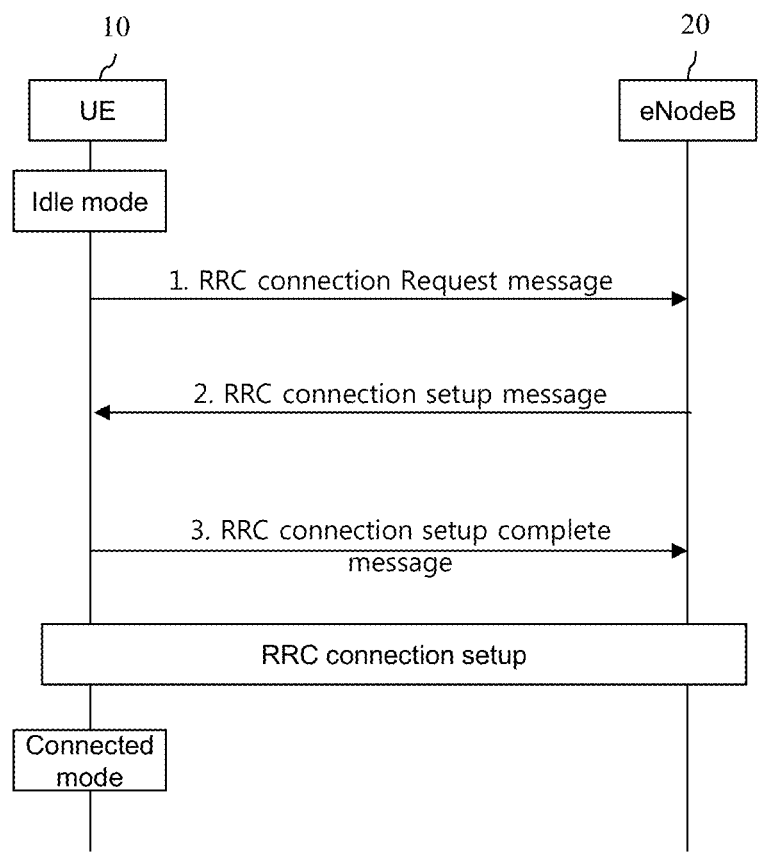
FIG. 6 illustrates a connection process in a radio resource control (RRC) layer.
Figure 7:
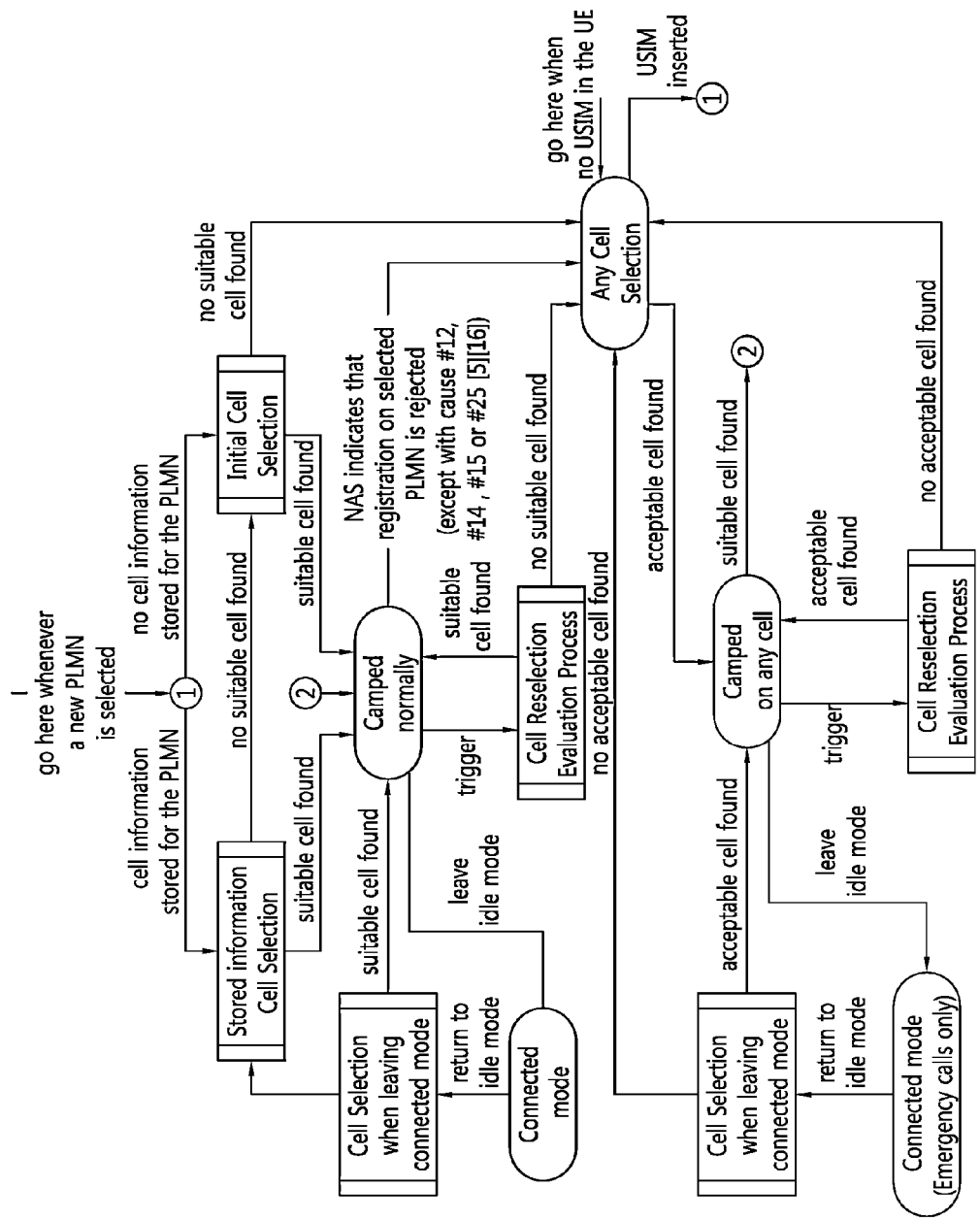
FIG. 7 shows the states and state transitions and procedures in RRC_IDLE.
Figure 8A:
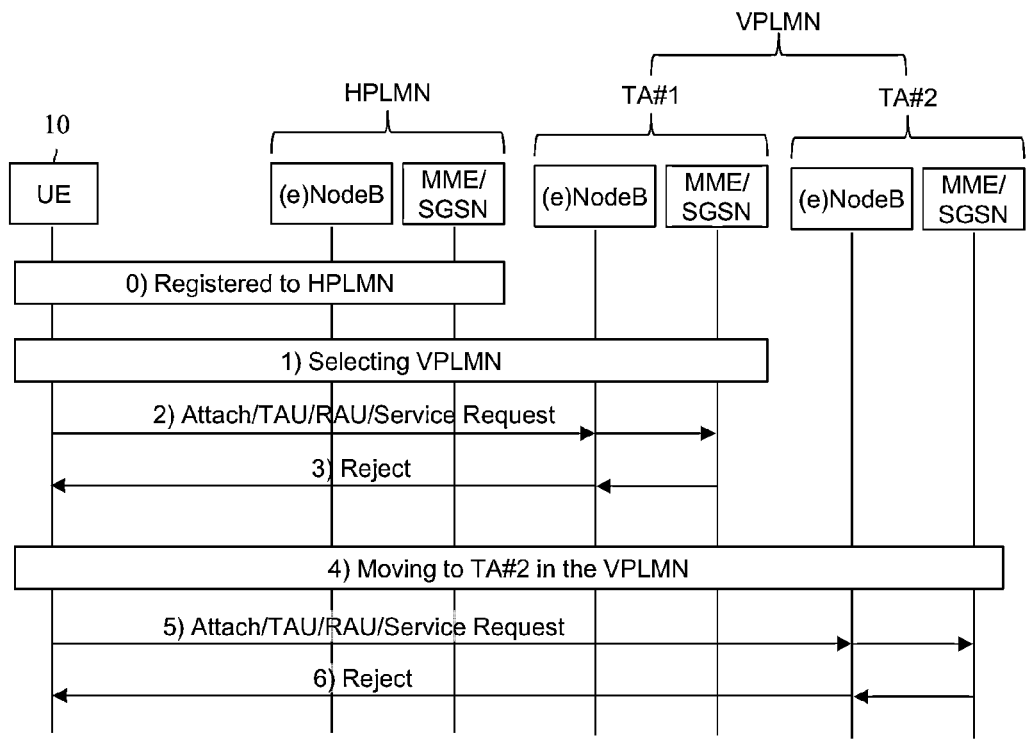
FIG. 8a shows an exemplary scenario where UE has experienced roaming failures.
Figure 8B:
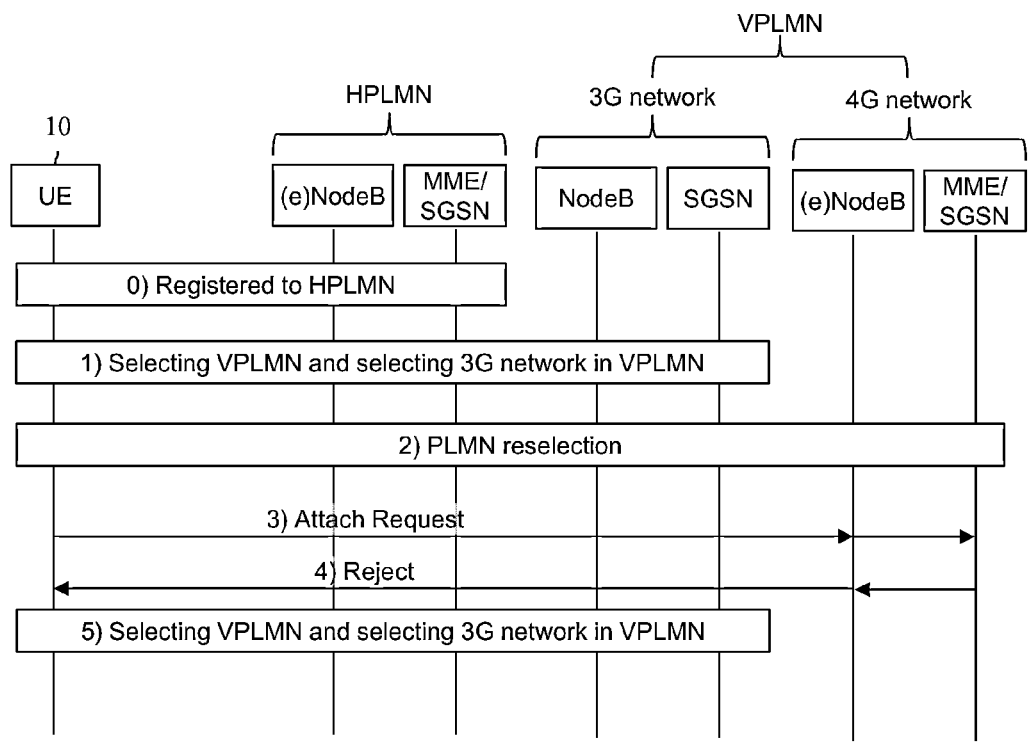
FIG. 8b shows another exemplary scenario where UE has experienced roaming failures.

Referring the FIG. 6, a UE selects a radio access technology (RAT) for communicating with a PLMN from which the UE intends to be served at step S50. Information about the PLMN and the RAT may be selected by the UE. The UE may use information stored in a universal subscriber identity module (USIM).

The UE selects a highest cell among a measured BS and cells having higher quality than a predetermined value at step S51. This procedure is referred as an initial cell selection procedure, and performed by a UE turned on. The cell selection procedure will be described in the following. After the cell selection, the UE periodically receives system information from the BS. The predetermined value is a value defined in a communication system for ensuring a physical signal quality in data transmission/reception. Therefore, the predetermined value may vary with a RAT to which the each predetermined value is applied.

The UE determines whether to perform a network registration procedure at step S52. The UE performs a network registration procedure if needed at step S53. The UE registers self information (i.e. IMSI) for being served by the network (i.e. paging). The UE does not register whenever the UE selects a cell. When the UE's own information about the network, e.g., a tracking area identity (TAI), is different from information about the network provided from the system information, the UE performs the network registration procedure.

If a value of signal strength or signal quality measured from a BS serving the UE is lower than a value measured from a BS of neighbor cell, the UE may select one of other cells providing a better signal characteristic than the BS serving the UE. This procedure is referred as a cell reselection procedure, which is distinguished from the initial cell selection procedure. There may be a temporal constraint for preventing the UE from performing the cell reselection procedure frequently according to a change of a signal characteristic. The cell reselection procedure will be described in the following.

The UE performs a cell reselection procedure at step S54. The cell reselection procedure will be described below. If the new cell is selected, the UE may perform procedures described in step S52. If the new cell is not selected, the UE may perform the cell reselection procedure again.

A cell selection procedure is described in detail.

If a UE is turned on or is camped on a cell, the UE may perform procedures in order to receive a service by selecting a cell having suitable quality.

The UE in an RRC_IDLE needs to be ready to receive the service through the cell by selecting the cell having suitable quality all the time. For example, the UE that has been just turned on must select the cell having suitable quality so as to be registered into a network. If the UE that has stayed in an RRC_CONNECTED enters into the RRC_IDLE, the UE must select a cell on which the UE itself is camped. As such, a procedure of selecting a cell satisfying a certain condition by the UE in order to stay in a service waiting state such as the RRC_IDLE is called a cell selection. The cell selection is performed in a state that the UE does not currently determine a cell on which the UE itself is camped in the RRC_IDLE, and thus it is very important to select the cell as quickly as possible. Therefore, if a cell provides radio signal quality greater than or equal to a predetermined level, the cell may be selected in the cell selection procedure even though the cell is not a cell providing best radio signal quality.

Hereinafter, a method and procedure for selecting a cell by a UE in 3GPP LTE is described in detail. If power is initially turned on, the UE searches for available PLMNs and selects a suitable PLMN to receive a service. Subsequently, the UE selects a cell having a signal quality and property capable of receiving a suitable service among the cells provided by the selected PLMN.

The UE may use one of the following two cell selection procedures:

1) Initial cell selection: This procedure requires no prior knowledge of which RF channels are E-UTRA carriers. The UE may scan all RF channels in the E-UTRA bands according to its capabilities to find a suitable cell. On each carrier frequency, the UE need only search for the strongest cell. Once a suitable cell is found, this cell may be selected.

2) Stored information cell selection: This procedure requires stored information of carrier frequencies and optionally also information on cell parameters, from previously received measurement control information elements or from previously detected cells. Once the UE has found a suitable cell, the UE may select it. If no suitable cell is found, the initial cell selection procedure may be started.

A cell reselection procedure is described in detail.

After a UE selects a certain cell through a cell selection procedure, the signal strength and quality between the UE and a BS may be changed due to a change of the UE mobility and wireless environment. Therefore, if the quality of the selected cell deteriorates, the UE may select another cell providing better quality. If a cell is reselected in this manner, a cell providing signal quality better than that of the currently selected cell is selected in general. This procedure is called a cell reselection. A basic purpose of the cell reselection procedure is generally to select a cell providing best quality to the UE from the perspective of the radio signal quality.

In addition to the perspective of the radio signal quality, the network may notify the UE of a priority determined for each frequency. The UE that has received the priority may consider this priority more preferentially than the radio signal quality criteria during the cell reselection procedure.

As described above, there is a method of selecting or reselecting a cell based on the signal property of the wireless environment. When a cell is reselected in the cell reselection procedure, there may be cell reselection methods as described below, based on the RAT and frequency characteristics of the cell.

Intra-frequency cell reselection: A reselected cell is a cell having the same center-frequency and the same RAT as those used in a cell on which the UE is currently being camped.

Inter-frequency cell reselection: A reselected cell is a cell having the same RAT and a different center-frequency with respect to those used in the cell on which the UE is currently being camped.

Inter-RAT cell reselection: A reselected cell is a cell using a different RAT from a RAT used in the cell on which the UE is currently being camped.

Generally, the cell reselection procedure is as follows.

1) The UE receives parameters for the cell reselection procedure from the BS.

2) The UE measures quality of a serving cell and a neighboring cell for a cell reselection.

3) The cell reselection procedure is performed based on cell reselection criteria. The cell reselection criteria have following characteristics with regard to the measurement of serving cells and neighboring cells.

The intra-frequency cell reselection is basically based on ranking. The ranking is an operation for defining a criterion value for evaluation of the cell reselection and for ordering cells according to a magnitude of the criterion value by using the criterion value. A cell having the highest criterion is referred to as a best-ranked cell. The cell criterion value is a value to which a frequency offset or a cell offset is optionally applied on the basis of a value measured by the UE for a corresponding cell.

The inter-frequency cell reselection is based on a frequency priority provided by the network. The UE attempts to camp on at a frequency having the highest priority. The network may provide the same frequency priority to be commonly applied to UEs in a cell by using broadcast signaling or may provide a frequency-specific priority to each UE by using dedicated signaling for each UE. The cell reselection priority provided by the broadcast signaling may be referred to as a common priority. The cell reselection priority to which the network assigns for each UE may be referred to as a dedicated priority. When the UE receives the dedicated priority, the UE also receives a validity time of the dedicated priority together. Upon receiving the dedicated priority, the UE starts a validity timer set to the received validity time. While the validity timer operates, the UE applies the dedicated priority in the RRC_IDLE. When the validity timer expires, the UE deletes the dedicated priority, and accordingly, applies to the common priority.

For the inter-frequency cell reselection, the network may provide parameters (e.g., frequency-specific offsets) for use in cell reselection to the UE for each frequency.

For the intra-frequency cell reselection or the inter-frequency cell reselection, the network may provide a neighboring cell list (NCL) for use in the cell reselection to the UE. The NCL includes cell-specific parameters (e.g. cell-specific offsets) used in the cell reselection.

For the intra-frequency or inter-frequency cell reselection, the network may provide the UE with a black list, i.e., a list of cells not to be selected in the cell reselection. The UE does not perform the cell reselection on cells included in the black list.

A reselection priorities handling is described. It may refer to a section 5.2.4.1 of 3GPP TS 36.304 V10.5.0 (2012-03).

Absolute priorities of different E-UTRAN frequencies or inter-RAT frequencies may be provided to the UE in the system information, in the RRCConnectionRelease message, or by inheriting from another RAT at inter-RAT cell (re)selection. In the case of system information, an E-UTRAN frequency or inter-RAT frequency may be listed without providing a priority (i.e. the field cellReselectionPriority is absent for that frequency). If priorities are provided in dedicated signaling, the UE may ignore all the priorities provided in the system information. If UE is in "camped on any cell" state, the UE may only apply the priorities provided by the system information from current cell, and the UE preserves priorities provided by dedicated signaling unless specified otherwise. When the UE in "camped normally" state, has only dedicated priorities other than for the current frequency, the UE may consider the current frequency to be the lowest priority frequency (i.e. lower than the eight network configured values). While the UE is camped on a suitable CSG cell, the UE may always consider the current frequency to be the highest priority frequency (i.e. higher than the eight network configured values), irrespective of any other priority value allocated to this frequency. If the UE has knowledge on which frequency a multimedia broadcast multicast service (MBMS) service of interest is provided, it may consider that frequency to be the highest priority during the MBMS session. The UE may delete priorities provided by dedicated signaling when:

the UE enters RRC_CONNECTED state; or the optional validity time of dedicated priorities (T320) expires; or a PLMN selection is performed on request by NAS.

The UE may only perform cell reselection evaluation for E-UTRAN frequencies and inter-RAT frequencies that are given in the system information and for which the UE has a priority provided. The UE may not consider any black listed cells as candidate for cell reselection. The UE may inherit the priorities provided by dedicated signaling and the remaining validity time (i.e., T320 in E-UTRA, T322 in UTRA and T3230 in GERAN), if configured, at inter-RAT cell (re)selection.

Hereinafter, the PLMN selection will be explained in more detail.

For PLMN selection, the AS layer of the UE report a list of available PLMNs to the NAS layer on request from the NAS or autonomously.

The NAS layer of the UE evaluates the PLMNS in the list reported by the AS layer and selects one PLMN to which the UE registers among the PLMNS in the list. For doing this, the UE considers priority information on PLMN/RAT stored in the USIM.

The PLMN selection may be classified into two modes as follows:

Automatic PLMN selection: UE automatically selects one PLMN in the priority-based list of available PLMNS.

Manual PLMN selection: UE provides a user with the list of available PLMNs such that the user can select one in the list.

In case of automatic PLMN selection, until the UE's registration becomes successful, the UE selects PLMNs/RATs in a predetermined order and tries to perform registration. The predetermined order of PLMNs/RATs are as follows:

PLMNs listed in the HPLMN (Home PLMN) or the EHPLMN (Equivalent HPLMN);

PLMNs listed in the "User Controlled PLMN Selector with Access Technology;

PLMNs listed in the "Operator Controlled PLMN Selector with Access Technology";

PLMNs reported by the AS as high quality PLMNs;

MNs reported by the AS in decreasing order of signal quality;

Meanwhile, in case of manual PLMN selection, the UE provides the PLMN list in the same order as it of automatic PLMN selection. In this case, whenever the user want it, the user can reselect PLMN.

One embodiment of the present disclosure provides a method for effectively performing PLMN selection if a UE having subscribed to HPLMN having 2G/3G roaming agreement with VPLMN but no LTE roaming agreement receives a mobility management reject message such as an Attach/TAU/Service reject message with cause value #15 from a network node in the VPLMN.

Detail description will be explained below.

If a UE, which has subscribed to HPLMN having only roaming agreement for 2G/3G network with VPLMN, but no roaming agreement for LTE with the VPLMN, transmits a mobility management request message such as an Attach/TAU/RAU/Service request message to a network node in any TA of the VPLMN, the one embodiment of the present disclosure allows the network node to transmit a mobility management reject message such as Attach/TAU/Service Reject message including a rejecting cause value #15, a first timer (e.g., T1 timer) and a second timer (e.g., T2 timer)

Also, according to the one embodiment, the Attach/TAU/Service Reject message may further include an indication (or information) instructing the UE to disable a LTE capability (or E-UTRA capability) due to no LTE roaming agreement but having 2G/3G roaming agreement. If the UE receives the reject message, the UE starts the first timer (e.g., T1 timer) which is included in the reject message. Here, the first timer (e.g., T1 timer) is a timer for periodic LTE search during PLMN reselection). Thus, if the first timer (e.g., T1 timer) is started, the UE inserts information on the corresponding TA into a list of "forbidden tracking areas for roaming" and then search another TA in the same VPLMN or equivalent PLMN.

If the first timer (e.g., T1 timer) is expired, the UE starts a second timer (e.g., T2 timer). Here, the second timer (e.g., T2 timer) is a timer for disabling a LTE capability or E-UTRA capability. Thus, if the second timer (e.g., T2 timer) is started, the UE has to disable the LTE capability or E-UTRA (LTE) capability so that the UE tries to transmit an Attach/TAU/Service request message to a 2G/3G network node in the same TA of the same VPLMN, but not to a E-UTRAN in the same TA of the same VPLMN. While the first timer (e.g., T1 timer) is running, the UE can perform a PLMN reselection.

While the second timer (e.g., T2 timer) is running, the UE can not perform a PLMN reselection for LTE cell thereby not to select a LTE cell in the current VPLMN, but perform a PLMN reselection for a 2G/3G cell (i.e., UTRA/GERAN).

Meanwhile, if the second timer is expired, the UE enables the LTE capability or the E-UTRA capability so that the UE can try perform a registration procedure or location update procedure toward E-UTRAN (e.g., LTE network). In other words, after the second timer (e.g., T2 timer) is expired, the UE enables the LTE capability so that the UE can perform a PLMN reselection for LTE cell thereby selecting the LTE cell in the current VPLMN.

Meanwhile, a value of the first timer (e.g., T1 timer) and a value for the second timer (e.g., T2 timer) may be set to several minutes or hours (e.g. up to max 24 hours) by a network operator and the values, respectively or together, may be provided to the UE.

Figure 10:
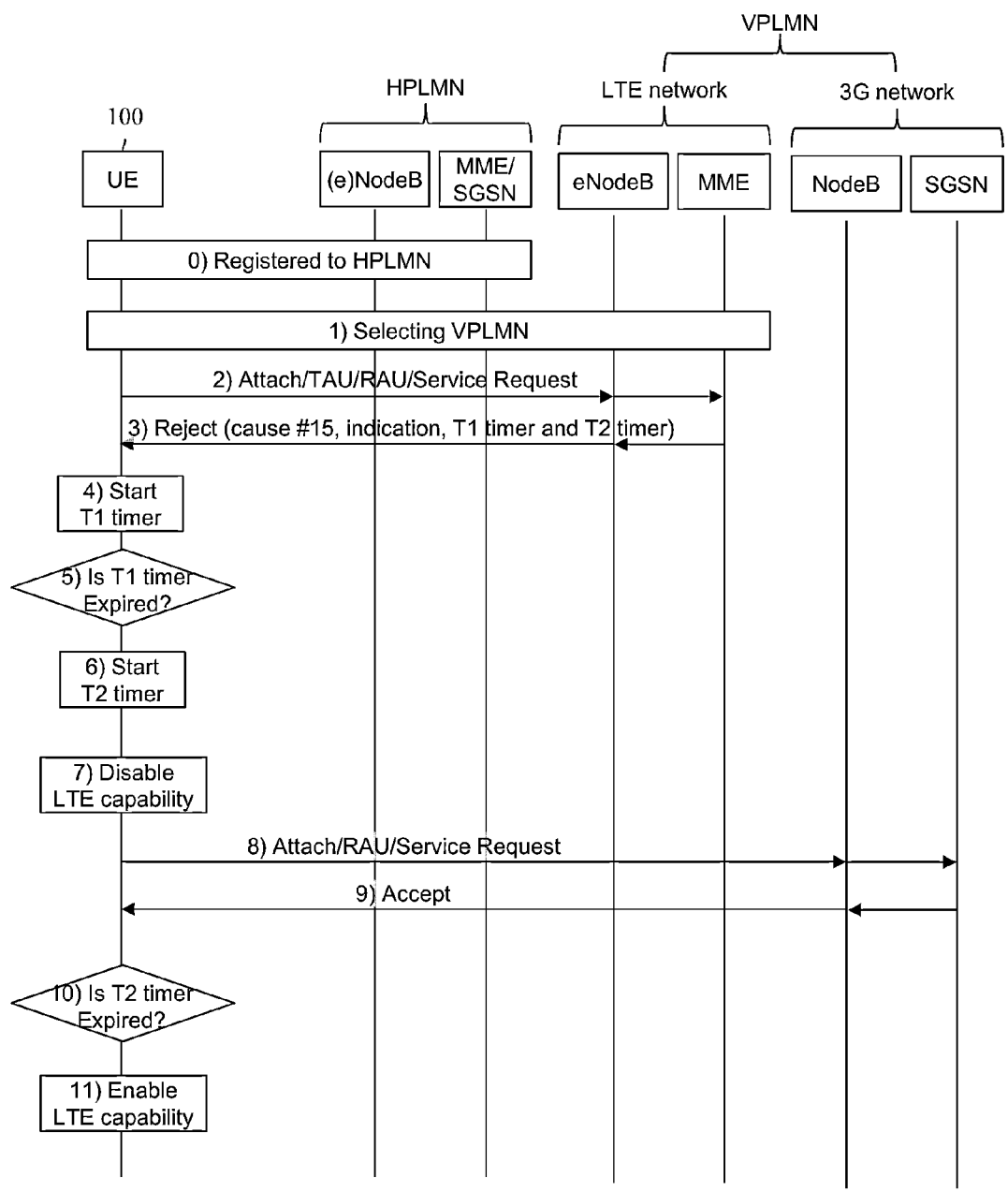
FIG. 10 shows an example method according to one embodiment of the present disclosure.

FIG. 10 shows an example method according to one embodiment of the present disclosure.

Referring to FIG. 10, it is assumed that the UE 100 has subscribed or registered to a Home Public Land Mobile Network (HPLMN). Also, it is assumed that there is only 2G/3G roaming agreement between HPLMN and VPLMN, but there is no 4G (e.g., LTE) roaming agreement between HPLMN and VPLMN.

As the UE 100 moves from the HPLMN to the VPLMN, the UE 100 transmits an Attach request message, a tracking area update (TAU) request message, a routing area update (RAU) request message, or a service request message to a MME in a 4G (e.g., LTE) network (e.g., E-UTRA) of the VPLMN.

However, because there is no 4G (e.g., LTE) roaming agreement between the HPLMN and the VPLMN, the MME in the 4G (e.g., LTE) network of the VPLMN transmits an Attach/TAU/RAU/Service reject message including a rejecting cause #15 indicating there is no suitable cell in the VPLMN. The rejecting cause #15 also means that the MME cannot accept a mobility management request from the UE in the corresponding TA so that the UE having to perform a PLMN registration and a location update finds out any other tracking area or location area in the VPLMN.

Here, according to the one embodiment, the Attach/TAU/Service Reject message may further include an indication (or information) instructing the UE 100 to disable a LTE capability (or E-UTRA capability) due to no LTE roaming agreement but having 2G/3G roaming agreement, a first timer (e.g., T1 timer) and a second timer (e.g., T2 timer).

If the UE 100 receives the reject message, the UE 100 starts the first timer (e.g., T1 timer) which is included in the reject message. And, the UE 100 inserts information on the corresponding TA into a list of "forbidden tracking areas for roaming" and then search another TA in the same VPLMN or equivalent PLMN.

If the first timer (e.g., T1 timer) is expired, the UE 100 starts a second timer (e.g., T2 timer) and then disables the LTE capability or E-UTRA (LTE) capability.

After the T2 timer is started, the UE 100 tries to transmit an Attach/RAU/Service request message to a SGSN in a 3G network of the same VPLMN.

Meanwhile, if the second timer is expired, the UE enables the LTE capability or the E-UTRA capability so that the UE can try perform a registration procedure or location update procedure toward E-UTRAN (e.g., LTE network). In other words, after the second timer (e.g., T2 timer) is expired, the UE enables the LTE capability so that the UE can perform a PLMN reselection for LTE cell thereby selecting the LTE cell in the current VPLMN.

The above-described embodiments may be combined with one another. It should be appreciated by those skilled in the art that the embodiments may be easily combined with each other, and thus, detailed description of the combinations is skipped. Nonetheless, it should be noted that such combinations are not excluded from the scope of the present invention.

Figure 11:
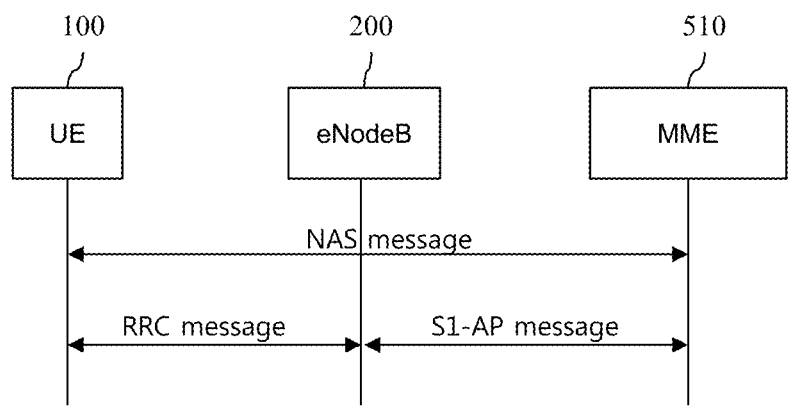
FIG. 11 is a view illustrating an exemplary protocol and interfaces between a UE, an eNodeB, and an MME.

FIG. 11 is a view illustrating an exemplary protocol and interfaces between a UE, an eNodeB, and an MME.

As shown in FIG. 11, the messages communicated between the UE 100 and the eNodeB 200 are based on an RRC (Radio Resource Control) protocol. The messages communicated between the eNodeB 200 and the MATE 510 are based on an S1-AP (S1 Application Protocol).

The messages communicated between the UE 100 and the MME 510 are based on an NAS (Non-Access Stratum) protocol. The NAS protocol-based messages are capsulated into RRC protocol-based messages and S1-AP-based messages and transmitted.

The embodiments described thus far may be implemented in hardware, which is described below in connection with FIG. 12.

Figure 12:
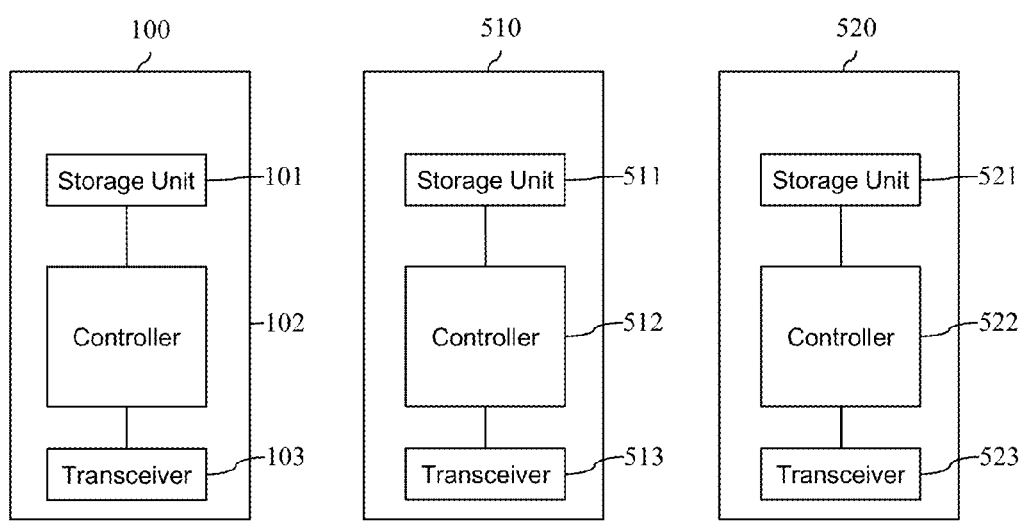
FIG. 12 is a block diagram illustrating the configuration of an MTC device 100, an MME 510, and an SGSN 520 according to an embodiment of the present invention.

FIG. 12 is a block diagram illustrating the configuration of an MTC device 100, an MME 510, and an SGSN 520 according to an embodiment of the present invention.

As shown in FIG. 12, the UE 100 includes a storage means 101, a controller 102, and a communication unit 103. The MME 510 includes a storage means 511, a controller 512, and a communication unit 513. Likewise, the S-GW 520 includes a storage means 521, a controller 522, and a communication unit 523.

The storage means 101, 511, and 521 store the methods described above.

The controllers 102, 512, and 522 control the storage means 101, 511, and 521, and the communication units 103, 513, and 523. Specifically, the controllers 102, 512, and 522 respectively execute the methods stored in the storage means 101, 511, and 521. The controllers 102, 512, and 522 transmit the above-described signals through the communication units 103, 513, and 523.

Although the present invention has been shown or described in connection with preferred embodiments thereof, the present invention is not limited thereto, and rather, various changes or modifications may be made thereto without departing from the scope of the present invention defined by the following claims.

What is claimed is:

1. A method for performing a mobility related procedure, the method performed by a user equipment (UE) and comprising:

transmitting, by the UE configured with a legacy communication capability and a long term evolution (LTE) communication capability, a mobility management request message to a first network entity in a LTE communication network of a visited public land mobile network (VPLMN);

receiving, by the UE and from the first network entity, a mobility management reject message including a rejecting cause value, a first timer and a second timer;

if the rejecting cause value indicates that there is no suitable cell in the VPLMN, starting the first timer included in the mobility management reject message;

if the first timer is expired, starting the second timer; and until the second timer is expired, disabling the LTE communication capability so that the UE tries to transmit the mobility management request message to a second network entity in a legacy communication network of the VPLMN.

2. The method of claim 1, wherein the first network entity is a mobility management entity (MME) and the second network entity is a Serving General Packet Radio Service (GPRS) Supporting Node (SGSN).

3. The method of claim 1, wherein:

the mobility management request message is one of attach request message, a tracking area update (TAU) request message, a routing area update (RAU) request message, a service request message; and the mobility management reject message is one of attach reject message, a TAU reject message, a RAU reject message, a service reject message.

4. The method of claim 1, wherein the first timer is a timer for periodic LTE search during public land mobile network (PLMN) reselection.

5. The method of claim 1, wherein the second timer is a timer for disabling the LTE mobile communication capability.

6. The method of claim 1, wherein the mobility management reject message further includes:

an indication instructing the UE to disable the LTE communication capability due to no LTE roaming agreement.

7. A user equipment (UE) for performing a mobility related procedure, comprising:

a transceiver configured with a legacy communication capability and a long term evolution (LTE) communication capability and configured to:

transmit a mobility management request message to a first network entity in a LTE communication network of a visited public land mobile network (VPLMN), and receive, from the first network entity, a mobility management reject message including a rejecting cause value, a first timer and a second timer; and a processor configured to control the transceiver, wherein if the rejecting cause value indicates that there is no suitable cell in the VPLMN, the processor is further configured to start the first timer included in the mobility management reject message, and wherein if the first timer is expired, the processor is further configured to start the second timer and disable the LTE communication capability until the second timer is expired, so that the UE tries to transmit the mobility management request message to a second network entity in a legacy communication network of the VPLMN.

8. The UE of claim 7, wherein the first network entity is a mobility management entity (MME) and the second network entity is a Serving General Packet Radio Service (GPRS) Supporting Node (SGSN).

9. The UE of claim 7, wherein:
the mobility management request message is one of attach request message, a tracking area update (TAU) request message, a routing area update (RAU) request message, a service request message; and
the mobility management reject message is one of attach reject message, a TAU reject message, a RAU reject message, a service reject message.

10. The UE of claim 7, wherein the first timer is a timer for periodic LTE search during public land mobile network (PLMN) reselection.

11. The UE of claim 7, wherein the second timer is a timer for disabling the LTE communication capability.

12. The UE of claim 7, wherein the mobility management reject message further includes:
an indication instructing the UE to disable the LTE communication capability due to no LTE roaming agreement.

* * * * *